(12) United States Patent
Thor et al.

(10) Patent No.: US 7,433,207 B2
(45) Date of Patent: Oct. 7, 2008

(54) BI-DIRECTIONAL ISOLATED DC/DC CONVERTER

(75) Inventors: Volker Thor, Essen (DE); Marc Bleukx, Mechelen (BE)

(73) Assignee: ASBU Holdings, LLC, Boulder, CO (US)

( * ) Notice: Subject to any disclaimer, the term of this patent is extended or adjusted under 35 U.S.C. 154(b) by 21 days.

(21) Appl. No.: 11/566,822

(22) Filed: Dec. 5, 2006

(65) Prior Publication Data

US 2007/0217229 A1    Sep. 20, 2007

Related U.S. Application Data

(60) Provisional application No. 60/782,651, filed on Mar. 15, 2006.

(51) Int. Cl.
　　*H02M 3/335*　　(2006.01)
　　*H02M 7/5387*　　(2007.01)
(52) U.S. Cl. .................. 363/17; 363/132; 323/222
(58) Field of Classification Search .......... 363/17, 363/131, 132; 323/222
　　See application file for complete search history.

(56) References Cited

U.S. PATENT DOCUMENTS

| | | | |
|---|---|---|---|
| 4,736,151 A | 4/1988 | Dishner | |
| 4,953,068 A * | 8/1990 | Henze | ............ 363/17 |
| 5,282,122 A | 1/1994 | Summer | |
| 5,751,150 A | 5/1998 | Rippel et al. | |
| 6,147,886 A | 11/2000 | Wittenbreder et al. | |
| 6,294,900 B1 * | 9/2001 | Greenwood et al. | ......... 323/222 |
| 6,356,059 B1 | 3/2002 | Yu | ............. 323/223 |
| 6,452,815 B1 * | 9/2002 | Zhu et al. | ..................... 363/17 |
| 6,580,252 B1 | 6/2003 | Yu | ............. 323/222 |
| 6,621,722 B1 | 9/2003 | Yu | ............. 363/127 |
| 6,674,107 B1 | 1/2004 | Yu | ............. 257/266 |
| 6,696,706 B1 | 2/2004 | Pegler | ........ 257/135 |
| 6,812,079 B1 | 11/2004 | Pegler | ........ 438/186 |
| 6,876,556 B2 * | 4/2005 | Zhu et al. | ..................... 363/17 |
| 6,937,483 B2 * | 8/2005 | Zhu et al. | ..................... 363/17 |
| 7,098,634 B1 | 8/2006 | Yu | ............. 323/224 |

* cited by examiner

*Primary Examiner*—Bao Q Vu
(74) *Attorney, Agent, or Firm*—Van Dyke, Gardner, Linn & Burkhart, LLP

(57) ABSTRACT

A bi-directional converter for converting voltage bi-directionally between a high voltage bus and a low voltage bus, having a switching converter connected across the high voltage bus, the switching converter having first and second switching modules connected in series across the high voltage bus, a switched node disposed between the switching modules being coupled to an inductor, the first and second switching modules being controllable so that the switching converter can be operated as a buck converter or a boost converter depending upon the direction of conversion from the high voltage bus to the low voltage bus or vice versa; the mid-voltage bus being coupled to a first full bridge switching circuit having two pairs of series connected switches with switched nodes between each of the pairs of switches being connected across a first winding of a transformer having a preset turns ratio.

20 Claims, 3 Drawing Sheets

BUCK MODE

BOOST MODE

BI-DIRECTIONAL ISOLATED DC/DC CONVERTER

CROSS REFERENCE TO RELATED APPLICATIONS

This application claims the benefit and priority of U.S. Provisional Application Ser. No. 60/782,651 filed Mar. 15, 2006 and entitled 1500 W BI-DIRECTIONAL ISOLATED DC/DC CONVERTER, the entire disclosure of which is incorporated by reference herein.

BACKGROUND OF THE INVENTION

The present invention relates to switching converters, and in particular to bi-directional switching converters. The present invention can be used in automotive as well as industrial applications where a wide DC high voltage range from 100 volts to 450 volts, for example, needs to be converted to a wide DC low voltage range from 7 volts to 16 volts, for example, and vice versa, with galvanic isolation between the two sides.

Classical bi-directional converters are made with multistage interleaved buck/boost converters which do not offer galvanic separation between the high voltage and low voltage side and which require substantial heatsink space for the voltage range described and the power range applicable, for example approximately 1500 watts.

Also, classical isolated converters that use transformers do not offer bi-directionality.

SUMMARY OF THE INVENTION

The present invention solves the above problems, providing bi-directionality, galvanic isolation and a very wide high voltage and low voltage side regulation range both with respect to voltage as well as power, for example from 0 to 1500 watts.

According to the invention, a bi-directional buck/boost converter and isolation transformer are employed with a fixed transformer ratio. The invention uses only a few power components so the whole function can be realized on a very compact cooling surface so that enough heatsink space remains available for other power electronics such as a motor driver which can be contained in the same mechanical housing.

Other features and advantages of the present invention will become apparent from the following description of the invention which refers to the accompanying drawings.

BRIEF DESCRIPTION OF THE DRAWING(S)

The invention will now be described in greater detail in the following detailed description with reference to the drawing figures in which.

DETAILED DESCRIPTION OF PREFERRED EMBODIMENTS OF THE INVENTION

Figure 1:
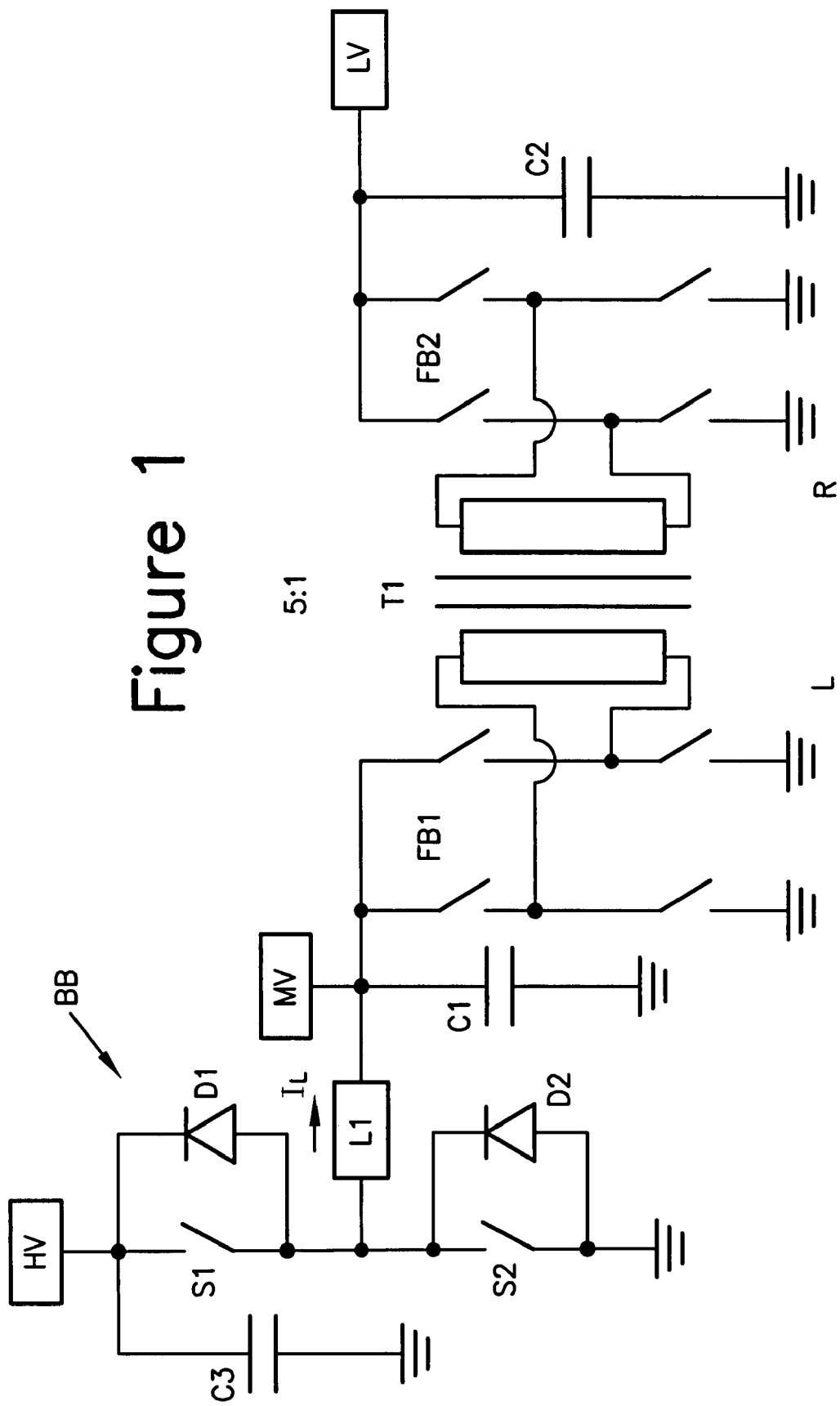
FIG. 1 is a schematic diagram of the invention.

With reference now to FIG. 1, the bi-directional converter of the invention comprises a transformer T1 having, for example, a turns ratio of, for example, 5:1 from the winding designated L to the winding designated R thereby providing a voltage step down function going from left to right and a step up function going from right to left. On the winding L side, a full bridge FB1 is connected across the winding. On the winding R side, a full bridge FB2 is connected across the winding. The switches of the bridges may be MOSFETs. The low voltage (LV) side has a capacitor C2 connected thereacross. A capacitor C1 is connected across the full bridge FB1 and establishes a bus MV or medium voltage bus.

A bi-directional buck/boost converter BB is provided between the high voltage bus HV and the bus MV. The bi-directional buck/boost converter BB may be realized with two fast 600 volt IGBTs S1 and S2 and their anti-parallel connected diodes D1 and D2, plus the storage inductor L1. The bi-directional buck/boost converter can convert, for example, a high voltage in the voltage range from 110 volts to 450 volts on bus HV to a mid-voltage (MV) range of 35 to 80 volts in a buck mode and vice versa in a boost mode.

Figure 2:
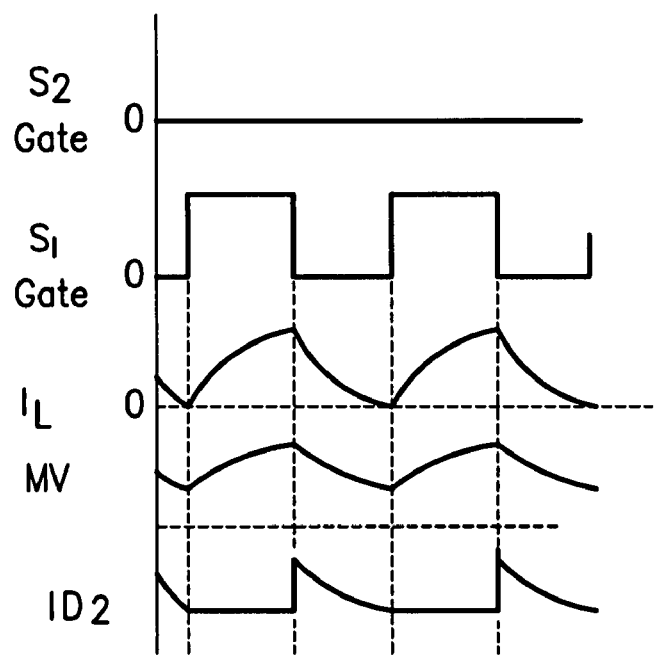
FIG. 2 shows waveforms of the buck/boost converter in buck mode.

In the buck mode, the converter BB switch S1 is switched on until a predefined current IL is reached through L1. Then it switches off so that D2 becomes conductive and allows the inductor current to continue to flow. At the moment, inductor L1 current drops to 0, D2 switches off. At the next cycle, switch S1 switches on again always at 0 current so that no hard switching occurs to improve reliability and efficiency. Hence the buck/boost converter is running in discontinuous mode and is current mode controlled. FIG. 2 shows the waveforms. Switch S2 is kept off in this mode.

Figure 3:
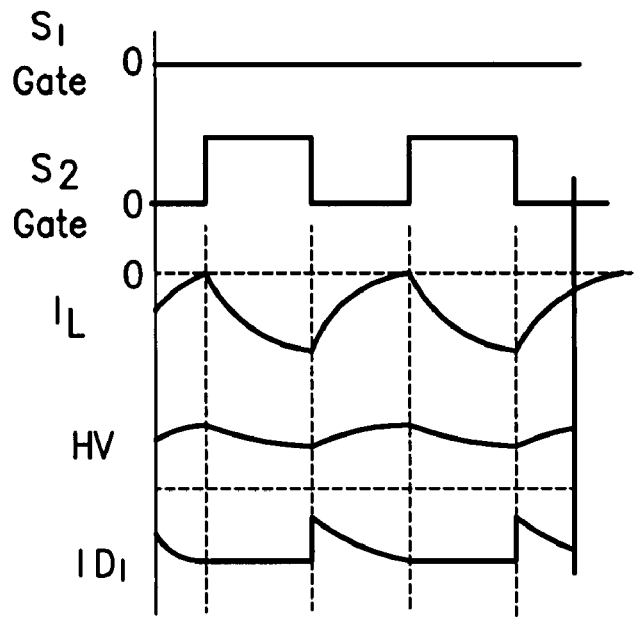
FIG. 3 shows waveforms of the buck/boost converter in boost mode.

In the reverse direction in boost mode, the same functional principle exists but here S2 and D1 take the role of S1 and D2 of the buck mode. Thus, switch S2 in the boost mode is turned on at the beginning of the cycle allowing the inductor L1 current to flow in charging up the inductor. The switch S2 is then turned off and the inductor current continues to flow through the diode D1 to supply the output high voltage plus HV in this direction. FIG. 3 shows the waveforms. Switch S1 is kept off in this mode.

Accordingly, the buck converter comprises the switch S1 and the diode D2 with the switch S2 being off in the buck mode, and in the boost mode, the boost converter comprises the switch S2 and the diode D1 with the switch S1 being off in the boost mode.

The capacitor C1 acts as a buffer capacitor between the buck/boost converter BB and the isolation transformer stage.

The planar transformer T1 may have, for example, a 5:1 ratio so that the highest LV voltage of 16 volts (×5=80 volts on the MV bus) can still be handled by the buck/boost converter at the minimum HV voltage of 10 volts. The higher turn MV winding of the transformer T1 is preferably sandwiched between a U-shaped LV winding for minimum stray inductance and losses. Transformer T1 preferably has an air gap to allow some asymmetry in the drive signals.

Bridges FB1 and FB2 may be MOSFET full bridge modules, with each MOSFET having its intrinsic body diode anti-parallel connected but not shown. FB1 and FB2 preferably run synchronously at 50% duty cycle for each full bridge diagonal with at least 100 nanoseconds dead time between the diagonals. In buck mode, FB1 acts as a driver and FB2 as a synchronous rectifier, with the MOSFET body diodes shorted by the MOSFET RDSON so that losses are minimized. In the boost mode FB2 is the driver and FB1 is a synchronous rectifier. C2 is the buffer capacitor at the low voltage (LV) side. A capacitor C3 at the high voltage (HV) side may be similarly disposed.

Figure 4:
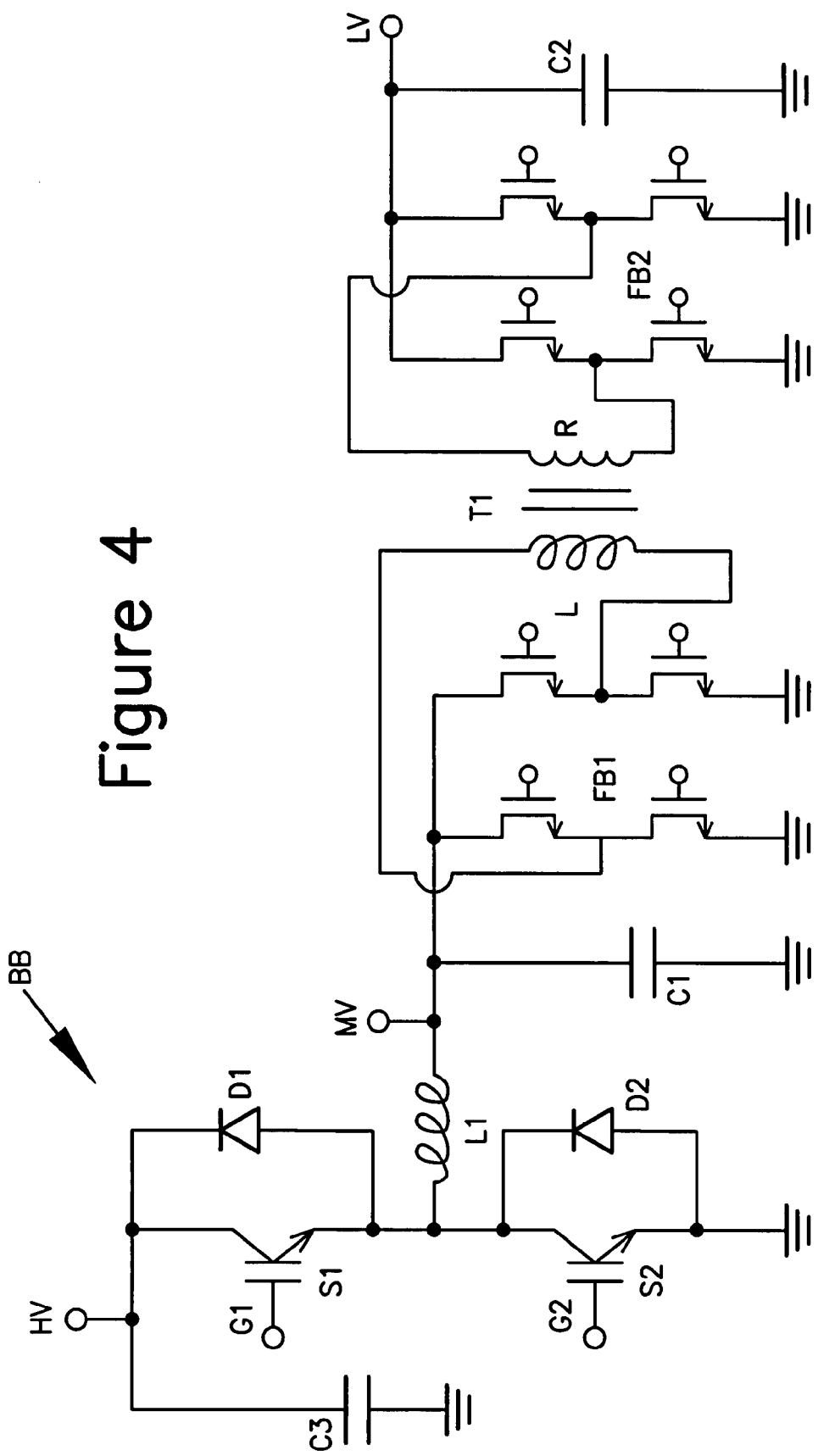
FIG. 4 shows a circuit diagram of the converter.

FIG. 4 shows a circuit diagram where the switches S1 and S2 are replaced by IGBTs and the switches of the bridges are shown as MOSFETs. Although the converter BB shows diodes D1 and D2, these diodes can be eliminated and the switches S1 and S2 can be appropriately controlled to obtain synchronous rectification. Accordingly, when operated in buck mode, switch S1 is controlled to provide current in the inductor L1 and when switch S1 is turned off, switch S1 is turned on synchronously to source the inductive current.

Similarly in the boost mode, switch S2 is turned on to allow current through the inductor to flow and when S2 is turned off, S1 is turned on to provide the boosted output voltage to the HV bus.

Although the present invention has been described in relation to particular embodiments thereof, many other variations and modifications and other uses will become apparent to those skilled in the art. Therefore the present invention should be limited not by the specific disclosure herein, but only by the appended claims.

What is claimed is:

1. A bi-directional converter for converting voltage bi-directionally between a high voltage bus and a low voltage bus, comprising:
   a switching converter coupled across the high voltage bus, the switching converter comprising first and second switching modules coupled in series across the high voltage bus, a switched node disposed between the switching modules being coupled to an inductor, the inductor coupled to a first capacitor, the connection between the inductor and the first capacitor comprising a mid-voltage bus, the first and second switching modules being controllable so that the switching converter can be operated as a buck converter or a boost converter depending upon the direction of conversion from the high voltage bus to the low voltage bus or vice versa;
   the mid-voltage bus being coupled to a first full bridge switching circuit comprising two pairs of series coupled switches with switched nodes between each of the pairs of switches be coupled across a first winding of a transformer having a preset turns ratio; and
   a second full bridge switching circuit comprising two pairs of series coupled switches with switched nodes between each of the pairs of switches being coupled across a second winding of said transformer, said second full bridge switching circuit being coupled to a second capacitor comprising a low voltage node.

2. The converter of claim 1, wherein the first and second switching modules comprise respective first and second semiconductor switches and an anti-parallel coupled diode coupled across each of the respective first and second switches.

3. The converter of claim 2, wherein, in a first conversion direction, a high voltage on the high voltage bus is converted to a low voltage on the low voltage bus and in a second conversion direction, a low voltage on the low voltage bus is converted to a high voltage on the high voltage bus.

4. The converter of claim 3, wherein in the first conversion direction, when high voltage is converted to a low voltage, the first of the switches comprising a switch coupled to the high voltage bus is turned on in the switching converter to charge the inductor and when said first switch is turned off, current flows through the inductor through the anti-parallel coupled diode coupled to the second switch thereby to provide a voltage to said mid-voltage bus, said second switch being maintained off in the first conversion direction.

5. The converter of claim 4, wherein in a second conversion direction, wherein a low voltage is converted to a high voltage, the second switch of said switching converter which is not connected to a high potential side of the high voltage bus is turned on to allow said inductor to charge and when said second switch is turned off, current flowing in the inductor continues to flow through the anti-parallel coupled diode coupled across the first switch coupled to the high voltage bus, thereby providing a high voltage to said high voltage bus, said first switch being maintained off in the second conversion direction.

6. The converter of claim 5, wherein said transformer has a turns ratio from the mid-voltage side to the low voltage side about of 5:1 and wherein the low voltage range is from approximately 7 volts to 16 volts and the high voltage range is approximately from 110 volts to 450 volts.

7. The converter of claim 1, further comprising a capacitor coupled to said high voltage bus.

8. The converter of claim 1, wherein the first and second full bridge switching circuits comprise MOSFET bridges.

9. The converter of claim 8, wherein the MOSFETs of the MOSFET bridges have internal body diodes.

10. The converter of claim 2, wherein the two switches of the switching converter coupled across the high voltage bus comprise IGBTs.

11. The converter of claim 1, wherein the transformer comprises a first mid-voltage winding sandwiched between a U-shaped low voltage winding to minimize stray inductance and losses.

12. The converter of claim 11, wherein the transformer has an air gap to allow asymmetry in signals driving the transformer.

13. The converter of claim 1, wherein in a first conversion direction comprising a buck mode, the first full bridge switching circuit acts as a driver for the transformer and the second full bridge switching circuit acts as a synchronous rectifier.

14. The converter of claim 13, wherein in the second conversion direction comprising a boost mode, the second full bridge switching circuit acts as a driver for the transformer and the first full bridge switching circuit acts as a synchronous rectifier.

15. The converter of claim 1, wherein said transformer provides galvanic isolation between the high voltage and the low voltage buses.

16. The converter of claim 1, wherein the first and second full bridge switching circuits are switched with a 50% duty cycle synchronously with a dead time therebetween.

17. The converter of claim 1, wherein in the first conversion direction, when high voltage is converted to a low voltage, the first of the switching modules comprising a first switch coupled to the high voltage bus is turned on in the switching converter to charge the inductor and when said first switch is turned off, current flows through the inductor through the second switching module which comprises a second switch turned on synchronously thereby to provide a voltage to said mid-voltage bus.

18. The converter of claim 17, wherein in a second conversion direction wherein a low voltage is converted to a high voltage, the second switching module, comprising a second switch, which is not connected to a high potential side of the high voltage bus, is turned on to allow said inductor to charge and when said second switch is turned off, current flowing in the inductor continues to flow through the first switching module comprising a first switch coupled to the high voltage bus which is turned on synchronously thereby providing a high voltage to said high voltage bus.

19. A bi-directional converter for converting voltage bi-directionally between a high voltage bus and a low voltage bus, comprising:
   a switching converter coupled across the high voltage bus, the switching converter comprising first and second switching modules coupled in series across the high voltage bus, a switched node disposed between the switching modules being coupled to an inductor, the inductor coupled to a first capacitor, the connection between the inductor and the first capacitor comprising a mid-voltage bus, the first and second switching modules being controllable so that the switching converter can be operated as a buck converter or a boost converter depending upon the direction of conversion from the high voltage bus to the low voltage bus or vice versa; and the mid-voltage bus being coupled to a first full bridge switching circuit comprising two pairs of series coupled switches with switched nodes between each of the pairs of switches be coupled across a first winding of a transformer having a preset turns ratio.

20. A bi-directional converter for converting voltage bi-directionally between a high voltage bus and a low voltage bus, comprising:

a transformer having a turns ratio and comprising a low voltage winding coupled to said low voltage bus; and a bi-directional buck/boost converter coupled to a high voltage winding of said transformer and coupled to said high voltage bus, wherein said bi-directional buck/boost converter is operable as a buck converter or a boost converter depending upon the direction of conversion from the high voltage bus to the low voltage bus or vice versa.

* * * * *

UNITED STATES PATENT AND TRADEMARK OFFICE
CERTIFICATE OF CORRECTION

PATENT NO. : 7,433,207 B2
APPLICATION NO. : 11/566822
DATED : October 7, 2008
INVENTOR(S) : Thor et al.

Page 1 of 1

It is certified that error appears in the above-identified patent and that said Letters Patent is hereby corrected as shown below:

<u>Column 2:</u>
Line 49, "10" should be --110--

Signed and Sealed this

Sixteenth Day of December, 2008

JON W. DUDAS
*Director of the United States Patent and Trademark Office*